United States Patent [19]
Itsuzaki et al.

[11] Patent Number: 5,995,663
[45] Date of Patent: Nov. 30, 1999

[54] SHAPE DETECTION APPARATUS

[75] Inventors: Yoshihiro Itsuzaki, Kashihara; Masatoshi Nakamura, Nishinomiya; Noriyuki Suzuki, Neyagawa; Misuzu Takano, Hirakata; Kinji Horikami, Suita, all of Japan

[73] Assignee: Matsushita Electric Industrial Co., Ltd., Osaka-fu, Japan

[21] Appl. No.: 08/985,905

[22] Filed: Dec. 5, 1997

Related U.S. Application Data

[63] Continuation of application No. 08/374,202, Jan. 18, 1995, abandoned.

[30]     Foreign Application Priority Data

Jan. 18, 1994  [JP]  Japan .................................. 6-003333

[51] Int. Cl.⁶ .................................................. G06K 9/46
[52] U.S. Cl. .................................. 382/203; 382/291
[58] Field of Search .................................. 382/141, 291, 382/203, 199; 348/94, 95

[56]            References Cited

U.S. PATENT DOCUMENTS

| | | | |
|---|---|---|---|
| 4,578,810 | 3/1986 | MacFarlene et al. | 382/147 |
| 4,769,850 | 9/1988 | Itoh et al. | 382/203 |
| 4,922,543 | 5/1990 | Ahlbom et al. | 382/291 |
| 4,967,079 | 10/1990 | Shimura | 250/586 |
| 5,095,204 | 3/1992 | Novini | 356/240 |
| 5,136,661 | 8/1992 | Kobayasi et al. | 382/288 |
| 5,311,289 | 5/1994 | Yamaoka et al. | 382/141 |

FOREIGN PATENT DOCUMENTS 6-243253  9/1994  Japan .

OTHER PUBLICATIONS

Levine, *Vision in Man and Machine* McGraw–Hill, Inc., 1985, p. 523.

*Primary Examiner*—Von J. Couso
*Attorney, Agent, or Firm*—Wenderoth, Lind & Ponack, L.L.P.

[57]            ABSTRACT

A shape detection apparatus able to accurately detect the image position of a target object even when the shape of the scanning window does not match the shape of the image of the target, and even when the scanning position of the scanning window does not precisely match the image position of the target is provided. This shape detection apparatus comprises a video image producer; an image memory; an approximate position evaluator for evaluating the approximate position of the image of the target; an edge point detector for defining plural sampling line windows having a predetermined length for detecting the image density at the detected approximate position of the image, and detecting image density edge points in these sampling line windows as the contour point positions of the target image; and a detection window setter for setting the contour lines of the target image from the detected contour point positions.

13 Claims, 10 Drawing Sheets

SHAPE DETECTION APPARATUS

This application is a continuation of U.S. patent application Ser. No. 08/374,202, filed Jan. 18, 1995, now abandoned.

BACKGROUND OF THE INVENTION

1. Field of the Invention

The present invention relates to a shape detection apparatus used in the assembly process of a factory manufacturing line for visual recognition processing image data obtained from a target object by an imaging means, and recognizing such primary features of the target object such as shape, position, and attitude for use in such processes such as pass/fail quality determination and positioning for equipment operation.

2. Description of the Prior Art

Various shape detection principles have been applied according to the application and shape of the target object in conventional shape detection apparatuses. A conventional shape detection apparatus using the shape detection principle is described below with reference to FIG. 16.

Figure 16:
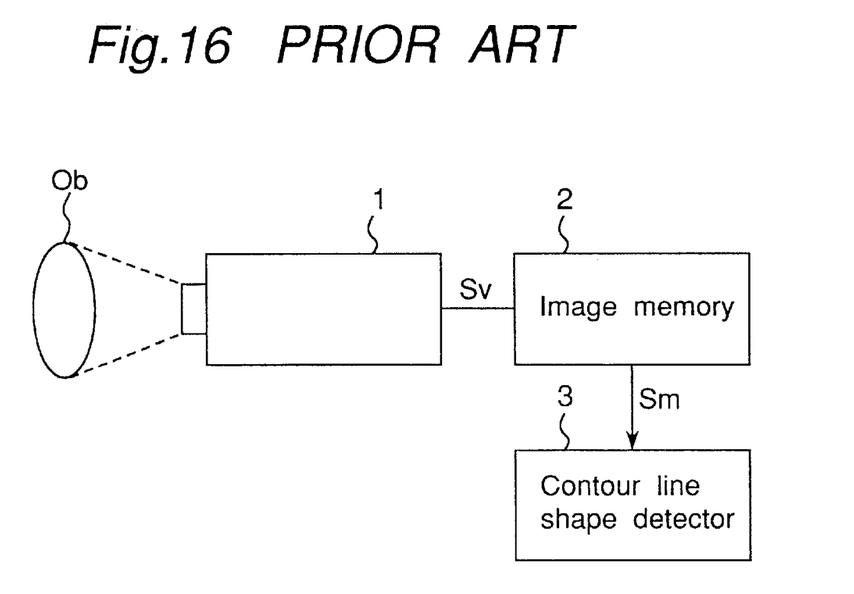
FIG. 16 is a block diagram showing an example of conventional shape detection apparatus.

In FIG. 16, one example of conventional shape detection apparatuses is shown. This shape detection apparatus detects the center of circular subjects wherein there is no contrast in image brightness other than at the contour lines. This may occur when a target object Ob of which the shape is being detected is a screw hole in sheet metal, for example. The shape detection apparatus in this example may be used to position machinery for screwing a screw into said screw hole.

A television camera or similar visual image sensor 1 captures an image of the object of which the shape is to be detected, and outputs the resulting image data Sv. The image memory 2 stores the digitized image data output by the visual sensor 1. The contour line shape detector 3 scans the image data Sm stored in the image memory 2 by means of a circular window 5 matching the shape of the target image, and detects the position at which the circular window matches the target image.

Figure 14:
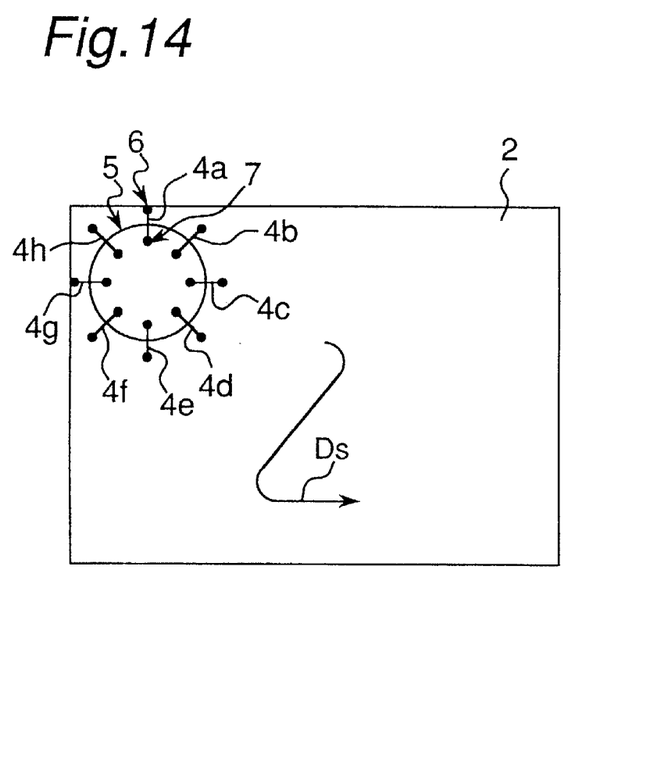
FIG. 14 is an illustration in assistance of explaining a shape detecting method using a circular detection window.
Figure 15:
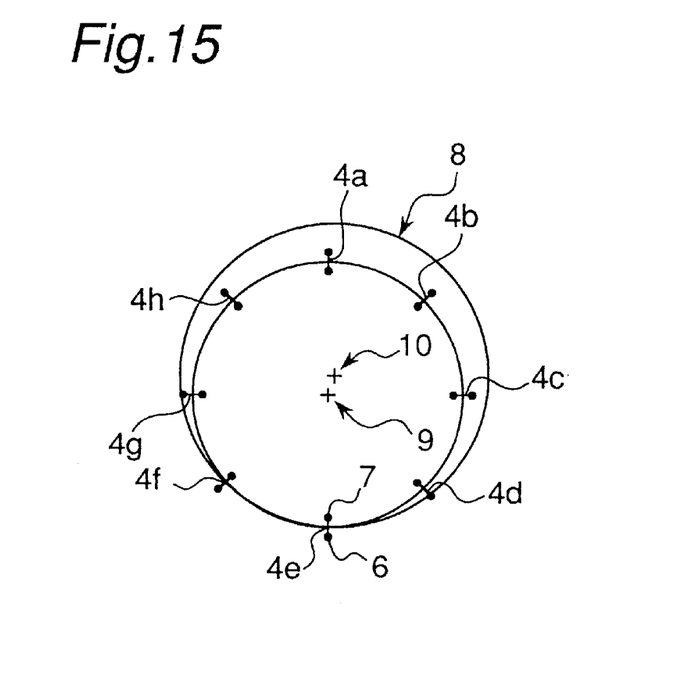
FIG. 15 is another illustration in assistance of explaining a shape detecting method using a circular detection window shown in FIG. 14.

Herebelow, the principle of detecting the position of a circular target object and the center thereof at high speed by means of a window shaped similarly to the contour lines of that object is described with reference to FIGS. 14 and 15. Note that the circular window 5 shown in FIG. 14 is contour line-shaped window of which the shape conforms to he contour lines of a reference image of the circular target object. Line windows 4a to 4h used for density difference detection are placed in the circular window 5 intersecting the outside edge of the circular window 5. The density difference detection line windows 4a to 4h are thus able to detect both outside image data 6 and inside image data 7 outside and inside, respectively, the circular window 5 in the area near the circumference.

The contour line shape detector 3 scans the image stored in the image memory 2 using this circular window 5. During this scanning operation, the density difference detection line windows 4a to 4h detect the outside image data 6 and the inside image data 7 outside and inside, respectively, the circular window 5. The image density difference between the outside image data 6 and inside image data 7 detected by the density difference detection line windows 4a to 4h is determined at each scanning position, and compared with an image data threshold value. The position of the circular window 5 where the number of density difference detection line windows at which the detected image density difference exceeds the threshold value is greatest is determined to be the image position of the circular target object. This detection method can be achieved by means of a relatively simple measurement and comparison operation, and enables high speed image detection.

With this method described above, the circular window 5 can quickly detect whether a circular image is at the scanning position or not, and can therefore scan quickly using a large scanning pitch to a point near the image to be detected. To detect the true image position, however, the scanning pitch must be reduced at a point near the target image, and the circular window 5 must be accurately aligned with the circular image. This limits the maximum achievable scanning and processing speed.

In addition, because the position detection precision obtained with the density difference detection line windows 4a to 4h is one-half the length of the window 4a to 4h, if the length of the windows 4a to 4h is shorter than the length allowable for the required detection precision, the diameter of the circular target image and the diameter of the circular window 5 will not match. For example, if the diameter of the circular window 5 is smaller than the diameter of the image of the circular target as shown in FIG. 15, the position of the circular window 5 where the number of density difference detection line windows at which the detected image density difference exceeds the threshold value is greatest will not be concentric to the image of the circular target; the circular window 5 will be positioned touching the inside of the contour line of the circular target image, and an error of one-half the difference between the diameter of the circular window 5 and the diameter of the image of the circular target may result.

SUMMARY OF THE INVENTION

The present invention has been developed with a view to substantially solving the above described disadvantages and has for its essential object to provide an improved shape detection apparatus.

In order to achieve the aforementioned, a shape detection apparatus for detecting the shape of an object comprises a digital image signal producing means for producing a digital image signal indicative of said object; an approximate position detecting means for detecting the approximate position of said object based on said digital image signal to produce a first position signal; an edge point detecting means for defining a plurality of sampling line windows having a predetermined length at said first position signal to detect the image density and determine edge points thereof, and for producing a second position signal indicative of said detected edge points; and a shape detecting means for detecting the shape of said object based on said second position signal.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1:
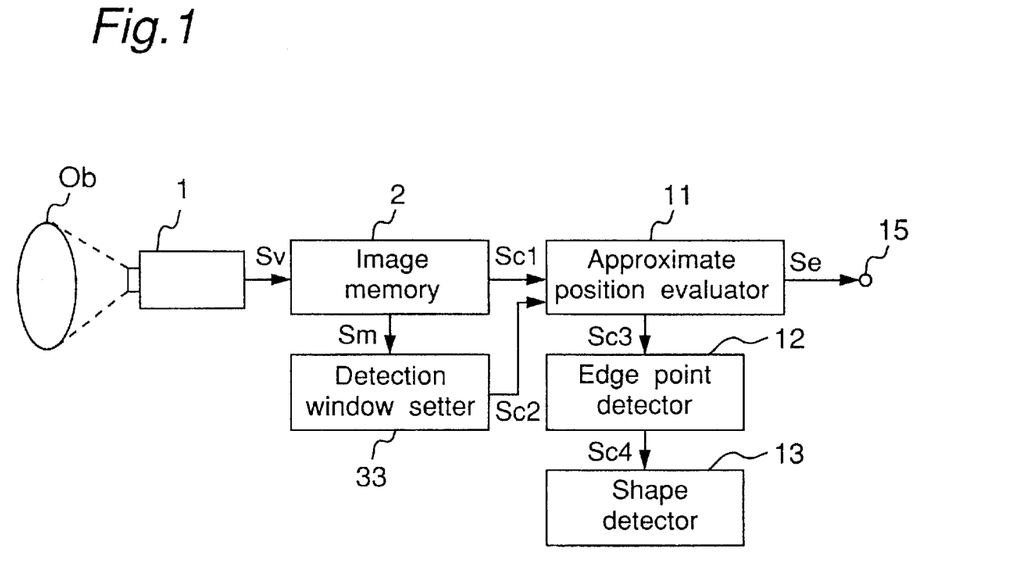
FIG. 1 is a block diagram showing a shape detection apparatus according to the present invention.

Referring to FIG. 1, a shape detection apparatus according to the present invention used for the detection of a target shape in a plate object Ob is shown. The shape detection apparatus includes a video image producer 1, an image memory 2, an approximate position evaluator 11, edge point detector 12, shape detector 13, and a detection window setter 33.

The video image producer 1 is comprised of a television camera or similar visual sensors, and captures an image of the object Ob of which the shape is to be detected. The video image producer 1 digitizes the resulting image data and outputs it as a video signal Sv. The image memory 2 stores the video signal Sv. The approximate position evaluator 11 reads out a first position signal Sc1, including coordinate data of the target image, from the image memory 2.

The detection window setter 33 is connected to the image memory 2 for receiving an image data signal Sm including coordinate data of the object image in the video signal Sv therefrom. The detection window setter 33 is an input/output device such as a light pen system by which the operator can set a detection window Dw matching the shape of the target image by designating points on the screen surface thereof with a light pen, and the coordinate data of thus set detection window Dw is output to the approximate position evaluator 11 as a second position signal Sc2.

Based on the first and second position signals Sc1 and Sc2, the approximate position evaluator 11 scans the image data (the first position signal Sc1) by a means of the detection window Dw (the second position signal Sc2 ). Thus, the approximate position evaluator 11 detects the position at which the detection window Dw matches the target image, and outputs a third position data signal Sc3 including coordinate data of the detected object.

At first, with reference to FIGS. 3, 14, and 15, the shape detection principle applied for detecting a circular shaped target object is described below. In FIG. 15, a contour line-shaped window of which the shape and size conform to the contour lines of a reference image of the circular target object is shown. Line windows 4a to 4h used for density difference detection are placed in the circular window 5 intersecting the outside edge of the circular window 5. The density difference detection line windows 4a to 4h are thus able to detect both outside image data 6 and inside image data 7 outside and inside, respectively, the circular window 5 in the area near the circumference.

The approximate position evaluator 11 scans the image stored in the image memory 2 using this circular window 5. During this scanning operation, the density difference detection line windows 4a to 4h detect the outside image data 6 and the inside image data 7 outside and inside, respectively, the circular window 5. The image density difference between the outside image data 6 and inside image data 7 detected by the density difference detection line windows 4a to 4h is determined at each scanning position, and compared with an image data threshold value. The position of the circular window 5 where the number of density difference detection line windows at which the detected image density difference exceeds the threshold value is greatest is determined to be the image position of the circular target object. Both the detection and comparison operations executed here are simple, thus enabling high speed image detection.

However, this operation is premised on the diameter of the circular window 5 matching the diameter of the contour line of the circular image of the circular target object. It is, in practice, difficult to assure a regular match between these diameters. Furthermore, if the length of the density difference detection line windows 4a to 4h is set to a length corresponding to the required position detection precision, e.g., if the diameter of the circular window 5 is smaller than the diameter of the circular target image as shown in FIG. 15, the position of the circular window 5 where the number of density difference detection line windows at which the detected image density difference exceeds the threshold value is greatest will not be concentric to the circular target image: the circular window 5 will be positioned touching the inside of the contour line of the circular target image, and an error of one-half the difference between the diameter of the circular window 5 and the diameter of the image of the circular target may result. As a result, the obtained center point will not be the actual center point of the target image, but will only be an approximate center point. The above described shape detecting method using a circular window can be conveniently conducted using apparatus such as disclosed in Japanese Laid-open Patent Publication No. H6-243253 published Sep. 2, 1994, assigned to the same assignee of the present application, the teachings of which are hereby incorporated by reference.

Based on the third position signal Sc3, the edge point detector 12 detects the actual center point from this approximate center point. As shown in FIG. 3, the edge point detector 12 sets plural radial sampling line windows 14a to 14h of a predetermined length from the approximate center point 16, and obtains the edge points 15a to 15h in each of the radial sampling line windows 14a to 14h. These edge points 15a to 15h are thus detected as the accurate contour point positions. Then, the edge point detector 12 produces a fourth position signal Sc4 including the coordinate data of the thus obtained edge points 15a to 15h.

The shape detector 13 detects the circular shape of the target image based on the equation of a circle based on the accurate contour point positions thus obtained by the edge point detector 12, and then obtains the center point of the detected target image.

Figure 2:
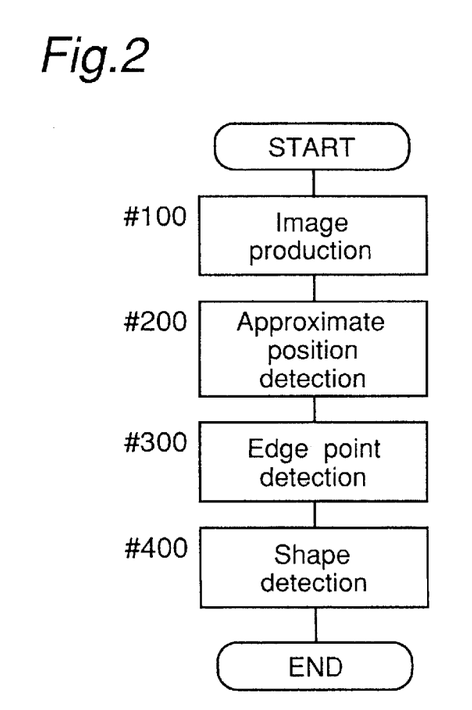
FIG. 2 is a flow chart showing the main routine of the shape detection apparatus of FIG. 1.

Referring to FIG. 2, the main routine of operation by the shape detection apparatus of FIG. 1 is shown.

At step #100 titled as "Image production", the image producer 1 captures an image of the object Ob, and outputs the video signal Sv to the image memory 2.

At step #200 titled as "Approximate position detection", the approximate position of the target image contour is detected. The approximate position evaluator 11 scans the image data Sc1 from the image memory 2 by means of the circular window 5 set by the window setter 33 so as to match the shape of the target image, as shown in FIG. 14. The evaluator 11, then detects the position at which the circular window 5 matches the target image, as described above.

Note that the circular window 5 is a contour line-shaped window of which the shape and size conform to the contour lines of a reference image of the circular target object, and line windows 4a to 4h used for density difference detection are placed intersecting the outside edge of the circular window 5. The density difference detection line windows 4a–4h are thus able to detect both outside image data 6 and inside image data 7 outside and inside, respectively, the circular window 5.

The approximate position evaluator 11 scans the image stored in the image memory 2 using this circular window 5. During this scanning operation, the density difference detection line windows 4a to 4h detect the outside image data 6 and the inside image data 7 outside and inside, respectively, the circular window 5. The image density difference between the outside image data 6 and inside image data 7 detected by the density difference detection line windows 4a to 4h is determined at each scanning position, and compared with an image data threshold value. The position of the circular window 5 where the number of density difference detection line windows at which the detected image density difference exceeds the threshold value is greatest is determined to be the approximate position of the circular target object. As a result, the third position signal Sc3 is produced. When it is impossible to produce the signal Sc3, The approximate position evaluator 11 outputs an error signal Se from an output terminal 15.

Figure 3:
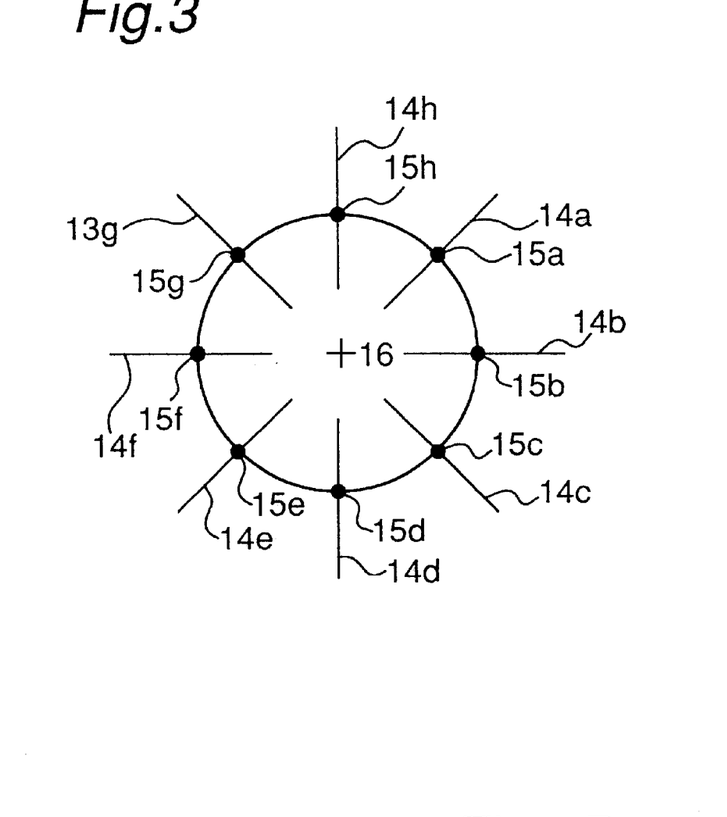
FIG. 3 is an illustration in assistance of explaining the radial sampling line windows according to the present invention.

At step #300 titled as "Edge point detection", the edge points are detected by the radial sampling line windows, plural radial sampling line windows 14a to 14h of a predetermined length L are set from the approximate center point 16, as shown in FIG. 3. The edge points 15a to 15h in each of the radial sampling line windows 14a to 14h are obtained. These edge points 15a to 15h are thus detected as the accurate contour point positions. As a result, the fourth position signal Sc4 is produced. It is to be noted that the operation described above with respect to the routine #200, #300, and #400 may be performed by means of a software programmed in a micro computer.

Figure 4A:
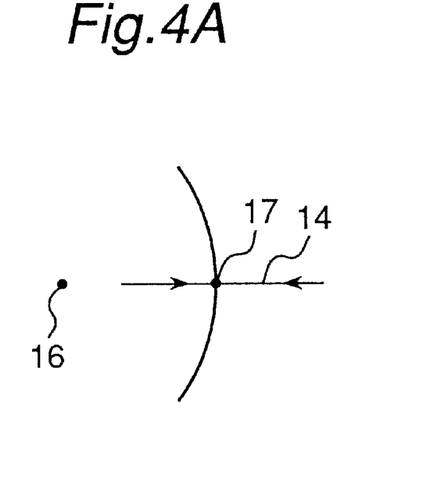
FIGS. 4A and 4B are illustrations in assistance of explaining the edge point detection principle according to the present invention.
Figure 4B:
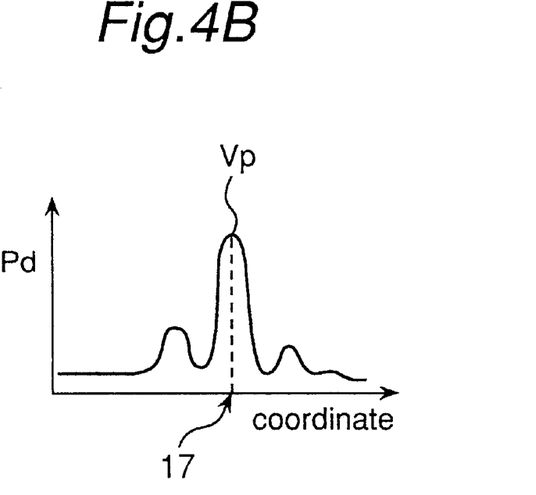

With reference to FIGS. 4A, 4B, 5A, 5B, 6A and 6B, the principle whereby these edge points 15a to 15h are obtained is described below. In FIGS. 4A and 4B, one sampling line window 14 and it's edge point 17 and the first differential value Pd of the window 17 with respect to the coordinate are typically shown, respectively, for the sake of brevity. The first differential Pd of the line window 14 shows a peak value Vp at the point 17.

With the method shown in FIGS. 4A and 4B, the first differential of the image data inside or outside of the circular window 5 is obtained inside each of the radial sampling line windows 14a to 14h shown in FIG. 3. Positions corresponding to the peak values Vp of this first differential are detected as the detected edge points 17a to 17h (not shown in FIG. 4A). According to this detection method, it is possible to detect the positions of these edge points (17a to 17h), but more time is required because the first differential is obtained for the total length of each of the radial sampling line windows 14a to 14h, and the differential peak values are then obtained. To resolve this problem, points similarly offset in approximately the same direction are detected as the edge points, although the resulting edge points are not the actual edge points, and the offset in the approximate same direction is cancelled by the process calculating the center position. Two methods for accomplishing this are shown in FIGS. 5A, 5B, 6A and 6B.

Figure 5A:
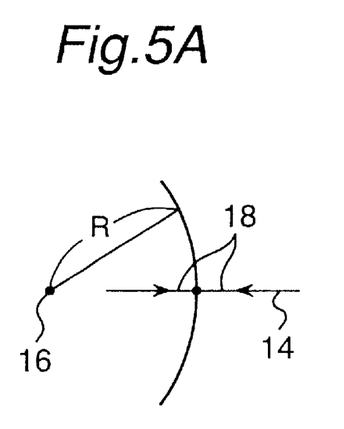
FIGS. 5A and 5B are illustrations in assistance of explaining another edge point detection principle according to the present invention.
Figure 5B:
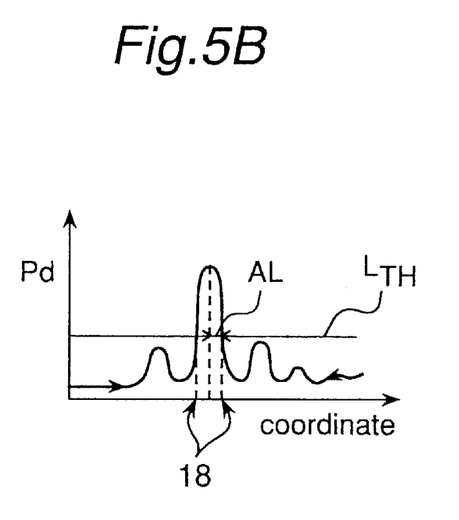

In FIGS. 5A and 5B, one sampling line window 14 and it's edge point 18 and the first differential value Pd with respect to the coordinate are typically shown, respectively. The first differential Pd of the line window 14 exceeds a predetermined threshold value $L_{TH}$ within an area indicated by points 18. With the method shown in FIGS. 5A and 5B, the first differential of the image data inside or outside of the circular window 5 is obtained inside each of the radial sampling line windows 14a to 14h, and the positions first exceeding, starting from the center point 16, a predetermined threshold value $L_{TH}$ are detected as the detected edge Points 18a to 18h (not shown in FIG. 5A). With this method there is a deviation AL between the detected edge points 18a to 18h and the true detected edge points 17a to 17h. This deviation AL is offset the same amount in the same direction from the contour lines being obtained either inside or outside the circular window 5, however, and the error thus occurring in the calculated position will be insignificant and can be ignored.

Figure 6A:
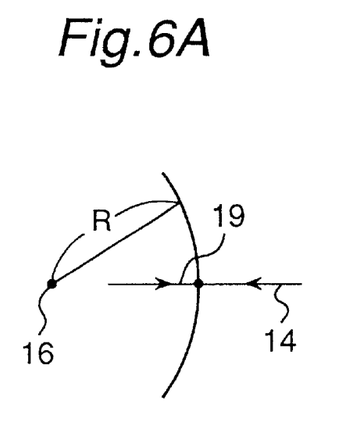
FIGS. 6A and 6B are illustrations in assistance of explaining other edge point detection principle according to the present invention.
Figure 6B:
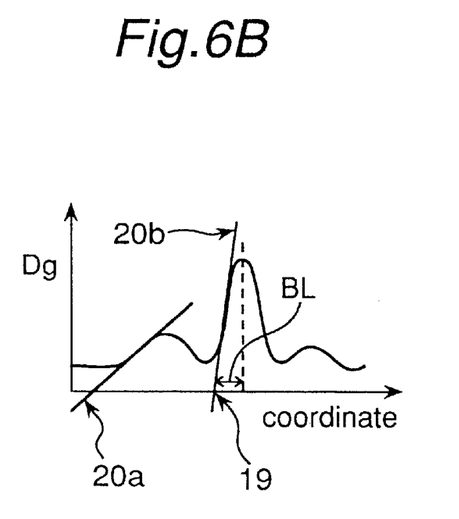

In FIGS. 6A and 6B, one sampling line window 14 and it's edge point 19 and the density Dg of the line window 14 with respect to the coordinate are typically shown, respectively. The density Dg changes with gradients 20a and 20b, for example, in FIG. 6B. In the method shown in FIGS. 6A and 6B, the density gradients 20a and 20b are obtained by calculating the ratio between the density difference within a predetermined interval and said predetermined interval inside or outside the radial sampling line windows 14a to 14h, and the position whereat the density gradients most closely match a predetermined density gradient threshold value are defined as the detected edge points 19a to 19h (not shown in FIG. 6A). With this method there is a deviation BL between the detected edge point 19 (points 19a to 19h) and the true detected edge point 17 (points 17a to 17h). This deviation BL is offset the same amount in the same direction from the contour lines being obtained either inside or outside the circular window 5, however, and the error thus occurring in the calculated position will be insignificant and can be ignored.

It should also be noted that with the methods shown in FIGS. 5A, 5B, 6A and 6B, if detection is applied both inside and outside the contour line, it is possible to separate two concentric overlaid images if the target image concentrically overlaps another image.

At step #400 titled as "shape detection", the approximate shape of the target object is detected based on the detected edge points (fourth position signal Sc4). Plural sets of three kinds of detected edge points at a predetermined interval are extracted for the detected edge points 17a to 17h, 18a to 18h, and 19a to 19h obtained at step #300 above. The center coordinates of the circle are then obtained based on the equation of a circle from these three edge points; and the peak of a frequency distribution of these center coordinates is detected as the true center point of the target image. Although the method for detecting the target image having a circular shape is described above, it is also possible to detect the true center point of a target image even when the target image is a non-circular image of any shape.

Figure 7:
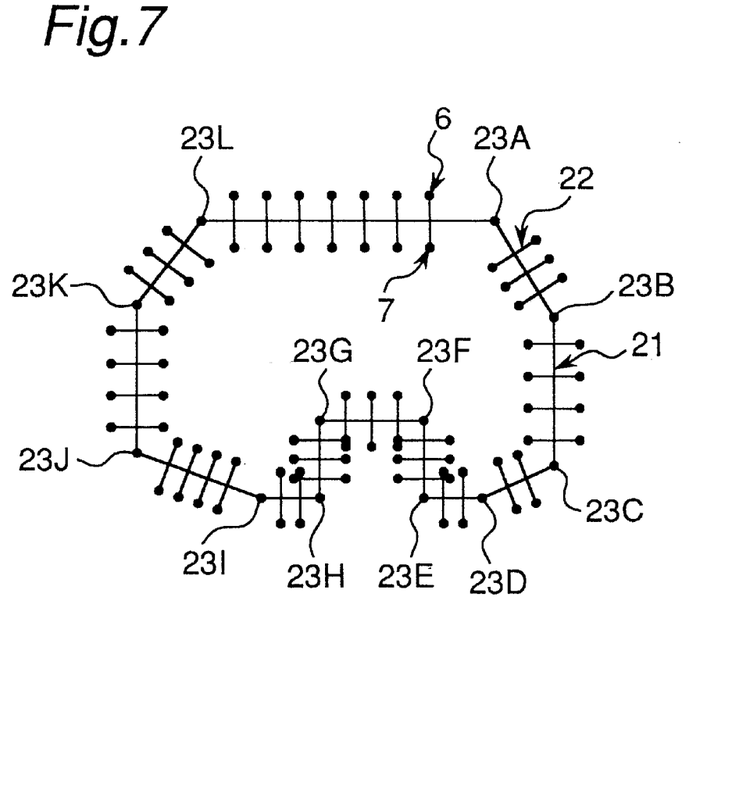
FIG. 7 is an illustration in assistance of explaining a free-shape polygonal window according to the present invention.
Figure 8:
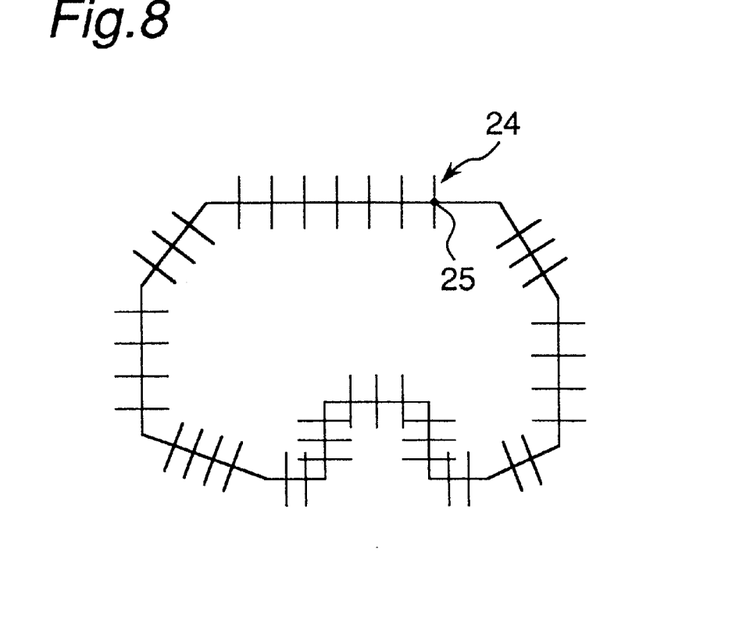
FIG. 8 is an illustration in assistance of explaining a sampling line window according to the second embodiment of the present invention.
Figure 9:
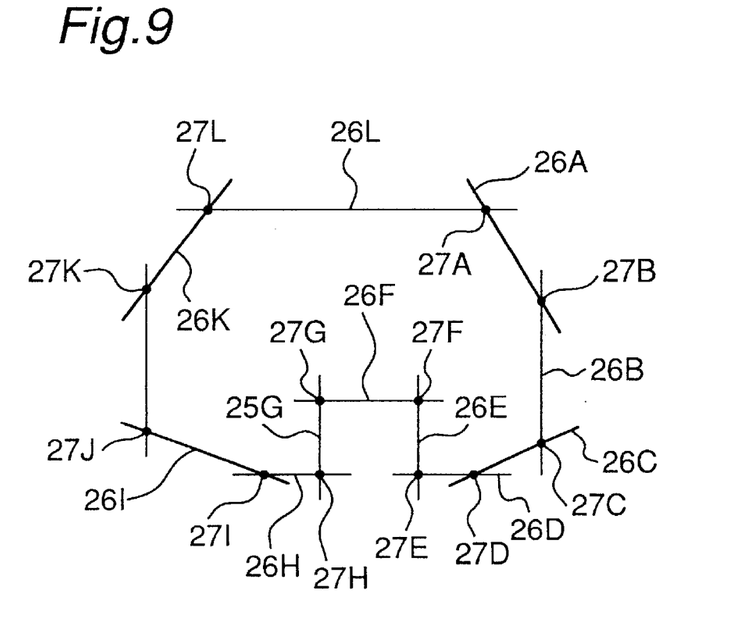
FIG. 9 is an illustration in assistance of explaining a shape detected by the shape detection apparatus according to the present invention.

At second, with reference to FIGS. 7, 8, and 9, the shape detection for the target image having non-circular shape is described herebelow.

Referring to FIG. 7, a freely shaped, nearly Polygonal window 21 as may be used when the shape of the target image is a non-circular image of any shape. Note that, the circular window 5 used in the above described method (FIG. 14) and this polygonal window 21 herein used are variations of the detection window Dw which the operator can set by the detection window setter 14.

The shape of the freely shaped, nearly polygonal window 21 shown in FIG. 7 is defined to approximate with a polygon the reference contour lines of the target image to be detected. Plural density difference detection line windows 22 are similarly provided in each side of this freely shaped, nearly polygonal window 21.

When the image data stored in the image memory 2 is scanned using this freely shaped, nearly polygonal window 21, the plural density difference detection line windows 22 detect the outside image data 6 and inside image data 7 outside and inside, respectively, the freely shaped, nearly polygonal window 21. The image density difference between the outside image data 6 and inside image data 7 detected by the density difference detection line windows 22 is determined at each scanning position, and compared with an image data threshold value. The position of the freely shaped, nearly polygonal window 21 where the number of density difference detection line windows 22 at which the detected image density difference exceeds the threshold value is greatest is determined to be the image position of the freely shaped target object.

This detection method can be achieved by means of a relatively simple measurement and comparison operation, and enables high speed image detection.

Referring to FIG. 8, sampling line windows 24 used in this method are shown. As in the circular window 5 shown in FIG. 3, plural sampling line windows 24 are established intersecting, with right angle, each side of the contour of the freely shaped, nearly polygonal window 21. Using the methods described with reference to FIGS. 4A, 4B, 5A, 5B, 6A, and 6B, the edge points 25 are detected in these sampling line windows 24.

Referring to FIG. 9, a polygonal shape detected by the apparatus according to the present invention is shown. This polygonal shape is obtained as follows. In each domain defined by the vertices 27A to 27L of the freely shaped, nearly polygonal window 21 shown in FIG. 7, the plural detected edge points 25 shown in FIG. 8 are applied in the equation of a line to obtain the approximate lines 26A to 26L, and the intersections of adjacent approximate lines 26A to 26L are detected as the approximate line intersections 27A to 27L.

With reference to FIGS. 10, 11, 12, and 13, details of the operation of steps #200, #300, and #400 of FIG. 2 are described below.

Figure 10:
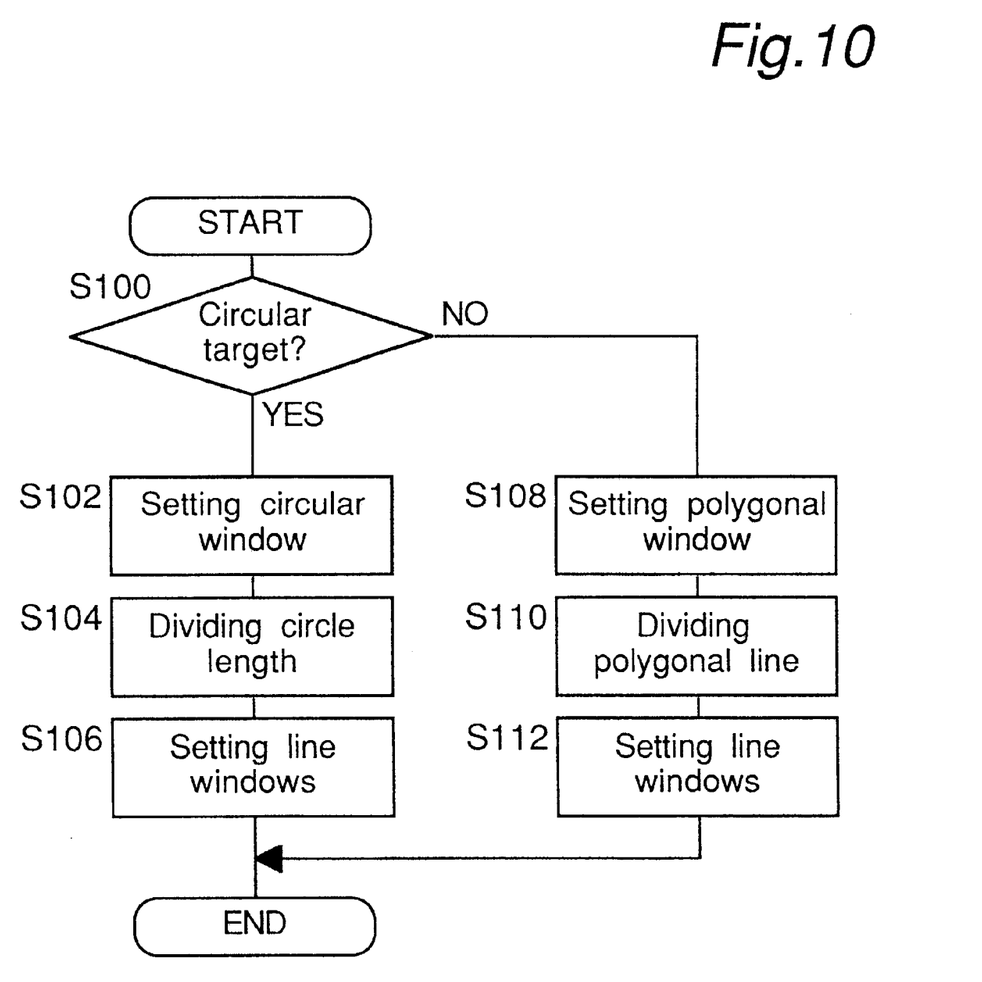
FIG. 10 is a flow chart showing an operation of detection window setting performed in the approximate position detection routine of FIG. 2.

Referring to FIG. 10, the operation for setting detection window Dw and line windows performed in step #200 is shown.

At step S100, it is judged whether the shape of target image is circular or not. In other words, it is judged whether the detection window Dw is set to a circular or a polygonal shape. This can be judged easily based on the second position signal Sc2 including the coordinate date of the window Dw. However, any suitable signal generator by which the operator can send a signal indicative of the target image shape or detection windows Dw to the following step may be provided. When it is judged "YES" at step S100 meaning that the circular window 5 is to be set, the procedure advances to step S102, S104, and S106, successively.

At step S102, the circular window 5 having a radius the same as that of the target image to be detected is formed.

At step S104, the circle circumference of the circular window 5 is equally divided into "N" portions ("N" is an integer), and coordinates of each of the dividing points Pn are obtained.

At step S106, line windows 4a to 4h extending in radial directions by a predetermined length "L" are set to cross dividing points Pn, respectively. Then, the procedure terminates.

However, when it is judged "NO" meaning that the polygonal window 21 is to be set at step S100, the procedure advances to step S108, S110, and S112, successively.

At step S108, the polygonal window 21 is formed along the contour of the target image.

At step S110, the side circumference of the polygonal window 21 is equally divided into "N" portions ("N" is an integer), and coordinates of each of the dividing points Pn are obtained.

At step S112, line windows 23A to 23L extending in radial directions by a predetermined length "L" are set to cross dividing points Pn, respectively, at a right angle. Then, the procedure terminates.

Figure 11:
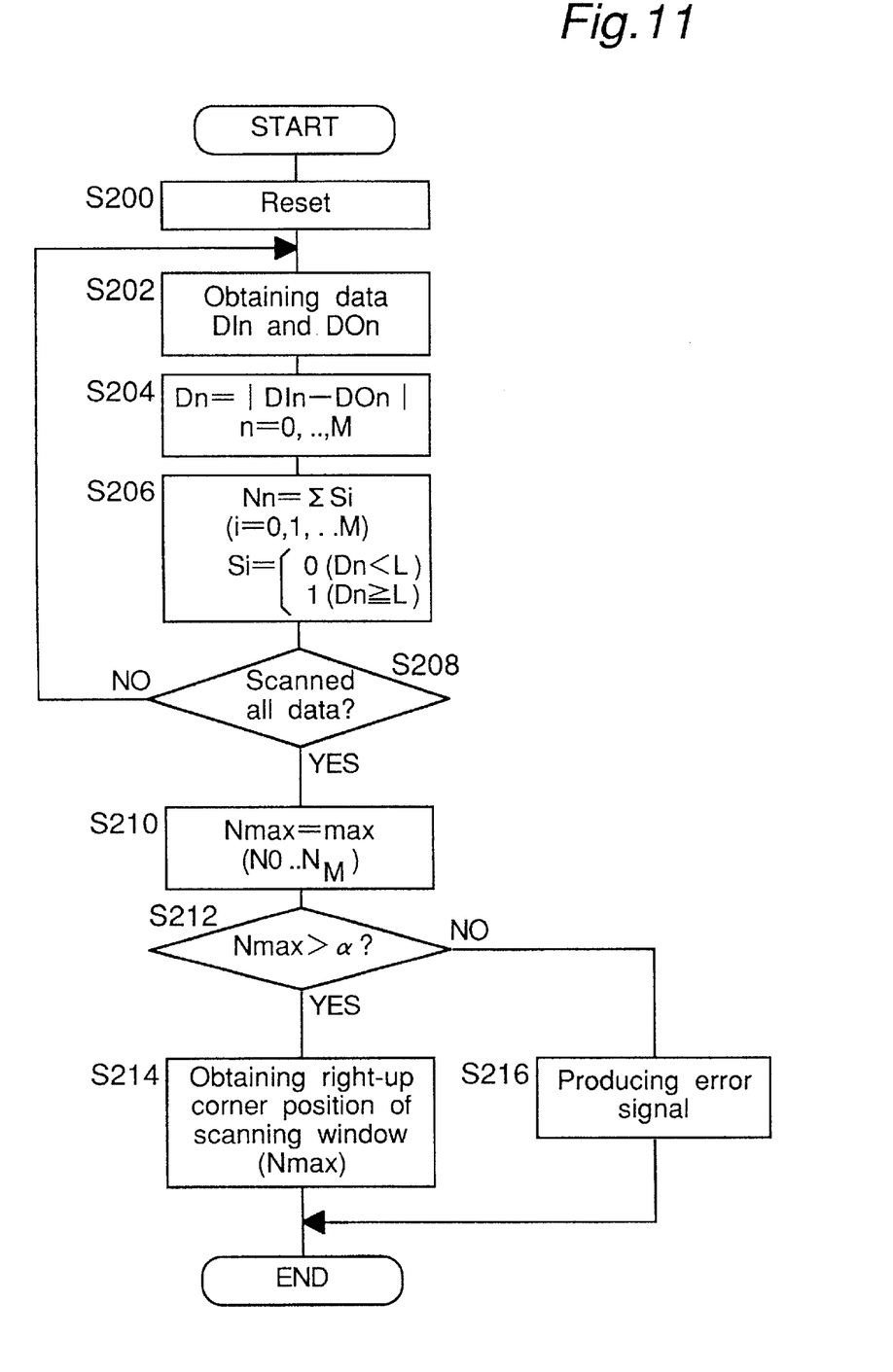
FIG. 11 is a flow chart showing another operation performed in the approximate position detection routine of FIG. 2.

Referring to FIG. 11, the operation of the approximate position detection routine performed in step #200 is shown.

At step S200, data in the detection window setter 33, approximate position evaluator 11, edge point detector 12, and shape detector 13 are reset.

At step S202, image data Din and Don corresponding to the coordinates of the points located on most inner end side and most outer end side, respectively, of each line window within the detection window are obtained.

At step S204, the density difference Dn of each line window is obtained, as expressed by an equation of $$Dn=|Din-Don|,$$

where "n" is an integer starting from 0 to a maximum number M of line windows.

At step S206, the number Nn of line windows whose density difference Dn is greater than the predetermined threshold $L_{TH}$, as expressed by an equation of $$Nn=\Sigma Si,$$

wherein "i" is an integer starting from 0 to M, Si is 0 when Dn is less than L, Si is 1 when Dn is not less than LI.

At step S208, it is judge whether the image data in the entire area are scanned or not. Until when the entire area is scanned, it is judged "No" at this step. Then, the procedure returns to step S202 and repeats the steps S202, S204, and S206. After scanning all data, it is judged "YES", and the procedure advances to step S210.

At step S210, the maximum number Nmax of line windows is calculated, as expressed by an equation of $$N\text{max} = \max(N0 \ldots N_M).$$

At step S212, it is judged whether the maximum number Nmax is greater than a predetermined number $\alpha$ or not. When it is judged "YES", the procedure advances to step S214. The number $\alpha$ can be determined in accordance with the shape of the target image, and is preferably a half number of line windows (M/2) for example.

At step S214, the coordinate (X,Y) of right-up corner position of a rectangle circumscribing the detection window Dw is obtained. Then, the procedure terminates.

However, when it is judged "NO" at step S212, the procedure advances to step S216.

At step S216, the error signal Se is produced, and then the procedure terminates.

Figure 12:
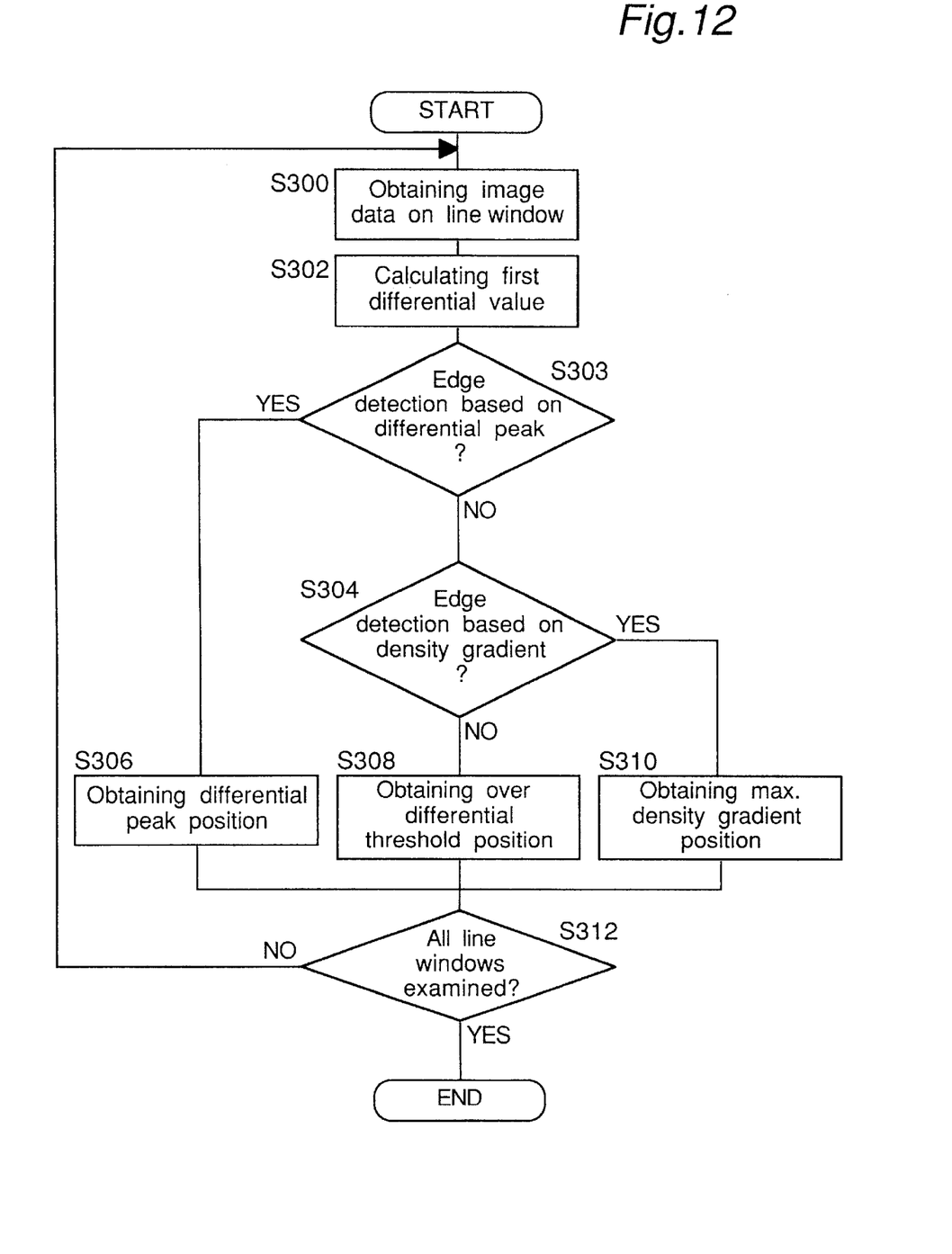
FIG. 12 is a flow chart showing an operation of the edge point detection routine of FIG. 2.

Referring to FIG. 12, the operation of the edge point detection routine performed in step #300 is shown.

At step S300, the image data on line windows are obtained.

At step S302, the first differential valves of the line windows are calculated.

At step S303, it is judged whether the edge detection is determined based on the peak value of first differential of line windows or not. When it is judged "YES", the procedure advances step S306.

At step S306, each of the positions where the first differential of line windows show peak is determined as the edge point. Then the procedure advances to step S312

However, when it is judged "NO" at step S303 meaning that the edge detection is determined based on other than the differential peak, the procedure advances to step S304.

At step S304, it is further judged whether the edge detection is determined based on the density gradient of the line window or not. When it is judged "YES", the procedure advances to step S310.

At step S310, each of positions where the density gradient of line windows shows the maximum value is determined as the edge point. Then the procedure advances to step S312.

However, when it is judged "NO" at step S304 meaning that the position where the first differential value of the line window exceeds the threshold $L_{TH}$ is determined as the edge point, the procedure advances to step S308.

At step S308, each first one of two points exceeding the threshold $L_{TH}$ is determined as the edge point. Then the procedure advances to step S312.

At step S312, it is judged whether the edge points are determined with respect to all line windows or not. Until all line windows have been examined, it is judged "NO" at this step. Then, the procedure returns to step S300 so that steps S300 to step S312 are repeated until the all line windows are examined, and then terminates.

It is to be noted that the operator can select any of the above three different methods for the edge detection and send a command signal indicative of his selection to the next step with any suitably provided device.

Figure 13:
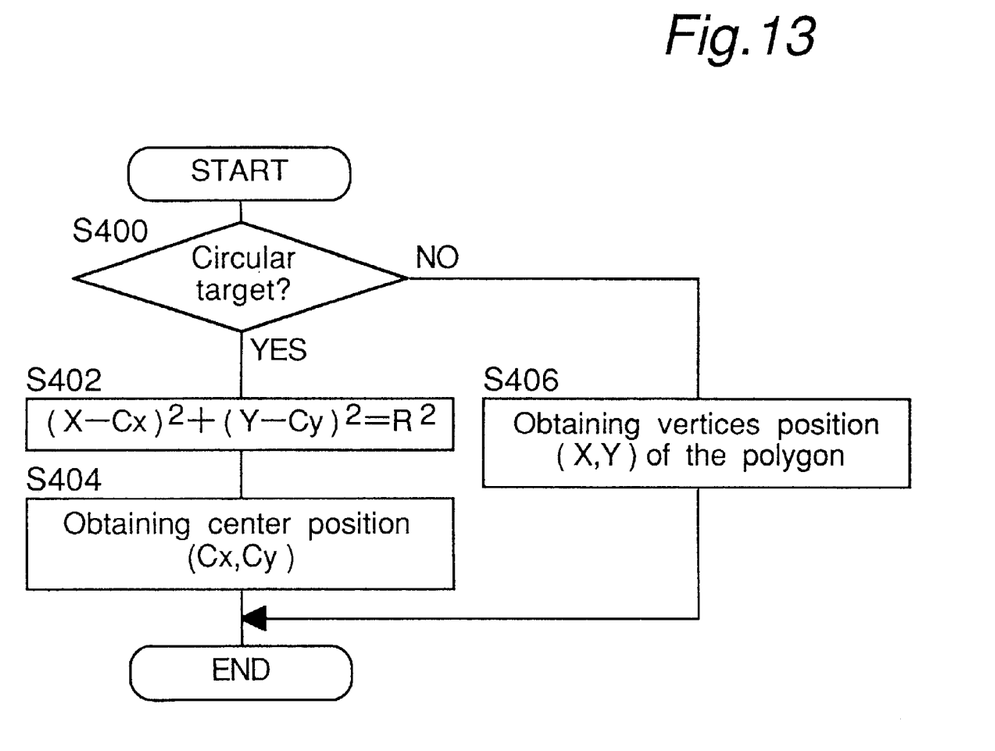
FIG. 13 is a flow chart showing an operation of the shape detection routine of FIG. 2.

Referring to FIG. 13, the operation of the shape detection routine performed in step #400 of FIG. 2 is shown.

At step S400, it is judged whether the detection window Dw is circular shape or not. When the detection window Dw is circular, the procedure advances to step S402 and S404, successively.

At step S402, a formula of an approximated circle is obtained by applying the square approximation to the coordinates of all edge points, as expressed by an equation of $$(X-Cx)^2 + (Y-Cy)^2 = R^2$$

At step S404, the coordinates of the center, and the radius R of the approximated circle obtained at step S402 are determined. Then the procedure terminates.

However, when the polygonal window 21 is used, it is judge "NO" at step S400. Then the procedure advances to step S406.

At step 406, all detected edge points are connected by a line, so that a polygon having vertices corresponding to those edge points are obtained. Then the procedure terminates.

A shape detection apparatus according to the present invention thus described detects the edge points of image density in plural sampling line windows of a predetermined length, and defines said edge points as points on the contour of the target image. As a result, the position of the target image can be accurately detected even when the shape and size of the scanning window and the shape and size of the target image do not match, and even when the position of the scanning window does not accurately match the position of the target image during image scanning insofar as the offset between the position of the scanning window and the target image contour is within the length of the sampling line windows. As a result, a shape detection apparatus according to the present invention can quickly detect the position of a target image with high precision.

The distinguishing features of the operation of a shape detection apparatus according to the present invention are described below.

First, by comprising an edge point detector for defining plural sampling line windows of a known length for detecting the image density at the approximate image position detected by the approximate position evaluator, and detecting the edge points of image density in these sampling line windows as the contour point positions of the target image, it is possible to accurately detect the contour point positions of the target image even when the position of the scanning window does not precisely match the position of the target image contour. This is because the edge points of the image density in the sampling line window can be detected as the contour point positions of the target image insofar as the offset between the position of the scanning window and the target image contour is within the length of the sampling line windows.

This offset between the scanning window position and the target image contour may result from a mismatch between the shape and size of the scanning window and the shape and size of the target image, or from an offset in the scanning position of the scanning window. However, because accurate detection is possible even when such an offset occurs, the position of the target image can be accurately detected even when the shape and size of the scanning window and the shape and size of the target image do not match, and even when the position of the scanning window does not accurately match the position of the target image during image scanning.

By further comprising a shape setter for setting the contour lines of the target image from the plural contour point positions detected by the edge point detector, the contour lines of the image of a target object of any shape can be approximated.

When the scanning window of the approximate position evaluator in a shape detection apparatus according to the present invention is a circular scanning window, and the arithmetic expression whereby the shape setter sets the contour lines of the target image from the plural contour point positions is an equation of a circle, the center point and diameter of a circular target object can be accurately detected.

When the scanning window of the approximate position evaluator in a shape detection apparatus according to the present invention is a freely shaped, nearly polygonal window approximating as a polygon the contour lines of a target image of any shape, and the arithmetic expression whereby the shape setter sets the contour lines of the target image from the plural contour point positions in each domain delineated by the vertices of the approximated polygon is a line equation, the position of a target object of any shape can be accurately detected, and the shape of the scanning window can be accurately set.

When the edge point detector in a shape detection apparatus according to the present invention comprises a detector whereby the first differential of the image data is obtained from inside or outside of the sampling line window, and the locations of the differential peak values are defined as the detected edge points, the detected edge points can theoretically be detected without error.

When the edge point detector in a shape detection apparatus according to the present invention comprises a detector whereby the first differential of the image data is obtained from inside or outside of the sampling line window, and the location first exceeding a predetermined differential threshold value is defined as the detected edge point, operating time is reduced and detection can be completed at high speed. It is to be noted that while there may be a slight error in the detected edge points, any such error will be offset from the contour lines being obtained by an equal amount in the same direction either inside or outside of the contour line, and any error thus occurring in the calculated position will be insignificant and can be ignored. In addition, if detection is applied both inside and outside the contour line, it is possible to separate two concentric overlaid images if the target image concentrically overlaps another image.

When the edge point detector in a shape detection apparatus according to the present invention comprises a detector whereby the density gradient inside or outside the sampling line window is obtained by calculating the ratio between the density difference within a predetermined interval and said predetermined interval, and the position whereat said density gradient most closely matches a predetermined density gradient threshold value is defined as the detected edge point, operating time is reduced and detection can be completed at high speed. It is to be noted that while there may be a slight error in the detected edge points, any such error will be offset from the contour lines being obtained by an equal amount in the same direction either inside or outside of the contour line, and any error thus occurring in the calculated position will be insignificant and can be ignored. In addition, if detection is applied both inside and outside the contour line, it is possible to separate two concentric overlaid images if the target image concentrically overlaps another image.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A shape detection apparatus for detecting the shape of an object (Ob) comprising:

a digital image signal producing means (1) for producing a digital image signal (Sv) indicative of an object image (Sc1) of the object (Ob);

an approximate position detecting means (33 and 11) for producing a designated scanning window (Sc2) configured in a shape having an outline conforming to the outline of object (Ob);

an edge point detecting means (12) for defining a plurality of sampling line windows (4 and 14) having a predetermined length (L), each sampling line window being provided to intersect the outline of the designated scanning window (Sc2) at a center point (15a–15h) of the sampling line window for detecting the image density and determining edge points (17, 18, 19, 25) of the object (Ob); and an object detection means (11, 13) for detecting the shape of the object (Ob) by scanning the digital image signal (Sv) to compare the object image (Sc1) with the designated scanning window (Sc2) and to produce a first position signal (Sc3), indicative of the position of the object (Ob) and a second position signal (Sc4) indicative of said determined edge points (17, 18, 19, 25), when a predetermined number of the center points (15a–15h) coincide with the edge points (17, 18, 19, 25).

2. A shape detection apparatus as claimed in claim 1, further comprising a memory means (2) for storing said digital image signal therein.

3. A shape detection apparatus as claimed in claim 1, wherein said approximate position detecting means (33 and 11) comprises:

a scanning window means for scanning said digital image signal with said designated scanning window (Sc2); and a first position detection means for comparing said object image (Sc1) with said designated scanning window (Sc2) to detect the approximate position of said object (Ob).

4. A shape detection apparatus as claimed in claim 3, wherein said designated scanning window (Sc2) is circularly shaped.

5. A shape detection apparatus as claimed in claim 3, wherein said designated scanning window (Sc2) is polygonally shaped.

6. A shape detection apparatus as claimed in claim 4, wherein said approximate position detecting means (33 and 11) detects a center (16) of said object (Ob) based on determined edge points (17, 18, 19, 25) with respect to an equation of a circle.

7. A shape detection apparatus as claimed in claim 5, wherein said approximate position detection means (33 and 11) detects an approximated polygon which is approximated to said object image (Sc1) based on said determined edge points (17, 18, 19, 25).

8. A shape detection apparatus as claimed in claim 7, wherein said object detecting means (11, 13) detects contour lines of said object image based on each domain delineated by the vertices of said approximated polygon with respect to a line equation.

9. A shape detection apparatus as claimed in claim 1, wherein said edge point detecting means (12) comprises a differentiating means for differentiating said sampling line windows.

10. A shape detection apparatus as claimed in claim 9, wherein said edge point detecting means (12) further comprises a determining means for determining the locations where each of said differentiated line windows has a peak value as said determined edge portions.

11. A shape detection apparatus as claimed in claim 9, wherein said edge portion detecting means (12) further comprises a determining means for determining the locations where each of said differentiated line windows first exceeds a predetermined differential threshold value as said determined edge points.

12. A shape detection apparatus as claimed in claim 1, wherein said edge point detecting means (12) further comprises a determining means for determining the locations where the density gradient of each of said sampling line windows most closely matches a predetermined density gradient threshold value as said determined edge points.

13. A shape detection apparatus as claimed in claim 1, wherein said approximate position detecting means (33 and 11) is for producing an error signal (Se) when the designated scanning window (Sc2) does not overlap the object image outline at a predetermined number of locations.

* * * * *

UNITED STATES PATENT AND TRADEMARK OFFICE
CERTIFICATE OF CORRECTION
5,995,663

PATENT NO. : November 30, 1999
DATED :
INVENTOR(S) : Yoshihiro ITSUZAKI et al.

It is certified that error appears in the above-identified patent and that said Letters Patent is hereby corrected as shown below:

On the cover page correct the fourth inventor's last name to read:

--Misuzu Yokomae--

Signed and Sealed this

Twenty-seventh Day of March, 2001

Attest:

NICHOLAS P. GODICI

Attesting Officer    Acting Director of the United States Patent and Trademark Office